United States Patent
Veselic et al.

(10) Patent No.: US 7,657,290 B2
(45) Date of Patent: Feb. 2, 2010

(54) POWER MANAGEMENT SYSTEMS AND METHODS FOR A MOBILE DEVICE

(75) Inventors: Dusan Veselic, Oakville (CA); Michael F. Habicher, Waterloo (CA)

(73) Assignee: Research In Motion Limited, Waterloo (CA)

( * ) Notice: Subject to any disclaimer, the term of this patent is extended or adjusted under 35 U.S.C. 154(b) by 619 days.

(21) Appl. No.: 11/156,388

(22) Filed: Jun. 20, 2005

(65) Prior Publication Data

US 2006/0287007 A1  Dec. 21, 2006

(51) Int. Cl.
*H04M 1/00* (2006.01)
*H04B 1/38* (2006.01)
*H01Q 11/12* (2006.01)
*H04B 1/04* (2006.01)
*H02J 7/00* (2006.01)
*G06F 1/00* (2006.01)
*G06F 11/30* (2006.01)

(52) U.S. Cl. ............... 455/572; 455/127.1; 455/573; 455/574; 320/116; 320/132; 320/138; 713/300; 713/330; 713/340

(58) Field of Classification Search ............ 455/127, 455/572, 573, 574, 127.1, 127.2, 127.3, 127.5, 455/343.1, 343.6; 713/300, 320, 330, 340; 320/124, 127, 132, 133, 138, 151, 112, 114, 320/116, 106, 126, 136, 139, 162, 128; 370/311; 307/64, 66, 85

See application file for complete search history.

(56) References Cited

U.S. PATENT DOCUMENTS

| | | | |
|---|---|---|---|
| 5,955,869 A * | 9/1999 | Rathmann | 320/132 |
| 6,288,522 B1 | 9/2001 | Odaohhara et al. | |
| 6,404,168 B1 | 6/2002 | Shoji | |
| 6,665,801 B1 * | 12/2003 | Weiss | 713/300 |
| 7,340,627 B1 * | 3/2008 | Harvey | 713/330 |
| 7,343,506 B1 * | 3/2008 | Fenwick | 713/340 |
| 7,424,314 B2 * | 9/2008 | Park | 455/573 |
| 2002/0113575 A1 * | 8/2002 | Lee | 320/132 |
| 2003/0052547 A1 | 3/2003 | Fischer et al. | |

(Continued)

OTHER PUBLICATIONS

Electronicstalk Editorial Team, "Power chip Manages Multiple handset Processors", May 27, 2004, Electronicstalk.com, www.electronicstalk.com/news/dal/dal108.html, p. 1-2.*

(Continued)

*Primary Examiner*—Nay A Maung
*Assistant Examiner*—Paul P Tran
(74) *Attorney, Agent, or Firm*—Jones Day; Krishna K. Pathiyal; Robert C. Liang

(57) ABSTRACT

Power management systems and methods are provided for a mobile device. A primary power management circuit may be configured to receive an input voltage and use the input voltage to supply power to the mobile device. A secondary power management circuit may be configured to select at least one of a battery input from a rechargeable battery, a first power source input, or a second power source input as the input voltage to the primary power management circuit. The primary power management circuit may use the first power source input to charge the rechargeable battery. The second power management circuit may use the second power source input to charge the rechargeable battery.

19 Claims, 10 Drawing Sheets

U.S. PATENT DOCUMENTS

| | | | |
|---|---|---|---|
| 2003/0193245 A1* | 10/2003 | Powers | 307/64 |
| 2004/0008007 A1 | 1/2004 | Nagai et al. | |
| 2004/0113585 A1* | 6/2004 | Stanesti et al. | 320/116 |
| 2004/0148531 A1* | 7/2004 | Yamazaki et al. | 713/300 |
| 2005/0253560 A1* | 11/2005 | Popescu-Stanesti et al. | 320/138 |

OTHER PUBLICATIONS

Qualcomm Incorporated, "Qualcomm Anounces New Family of Power Management Chips for Third-Generation Wireless Devices", San Diego Feb. 18, 2003, www.qualcomm.com, www.qualcomm.com/press/releases/2003/press1153_print.html, p. 1-2.*

Texas Instruments, Single-Chip Charge and System POwer-Path Management IC (bgTINYtm), Aug. 2004, www.ti.com, SLUS618G-Aug. 2004-Revised Sep. 2007, p. 1.*

Qualcomm CDMA Technologies: "PM6650," 'Online!, Jan. 1, 2005, XP002354872, Retrieved from the Internet on Nov. 17, 2005 from URL:http://www.cdmatech.com/products/pm6650.jsp, 2 pgs.

Texas Instruments: "Single-Chip Charge And System Power-Path Management IC (bqTINY™-III)," bq24030, bq24032, bq24032A, bq24035, bq24038, SLUS618D—Aug. 2004—Revised Oct. 2005, 33 pgs.

Texas Instruments: "Single-Chip Charge And System Power-Path Management IC (bqTINY™-III)," bq24030, bq24032, bq24035, SLUS618 Aug. 2004, 20 pgs.

Dialog Semiconductor: "Power Management IC for W-CDMA, Pub Date: Quad-band GSM, Wi-Fi and Bluetooth," DA9030-PB03-0404, 2 pgs 2004.

Texas Instruments: "Single-Chip Charge and System Power-Path Management Ic (bqTINY™-III)," bq24030, bq24032, bq24035, SLUS618 Aug. 2004, 20 pgs.

* cited by examiner

POWER MANAGEMENT SYSTEMS AND METHODS FOR A MOBILE DEVICE

FIELD

The technology described in this patent document relates generally to the field of mobile devices. More particularly, power management systems and methods are provided for a mobile device.

BACKGROUND

Providing an external source of power to a mobile device, such as a personal digital assistant ("PDA"), wireless two-way messaging device, cellular phone, etc., requires design considerations with respect to both the mobile device and the power source. Most mobile devices provide a distinct power interface for receiving power from a power source, for instance to recharge a battery, and a separate data interface for communicating. For example, many mobile devices use USB (Universal Serial Bus) interfaces for communicating and use a separate power interface, such as a barrel connector, for receiving power. One reason that a USB interface is not typically used as a power source for a mobile device is that USB specifications require that any devices which are connected to a USB host initiate enumeration within 150 msec of a USB cable being attached. Enumeration is the process whereby devices attached to the USB host request permission to access and draw power from the USB host or hub.

DETAILED DESCRIPTION

Figure 1:
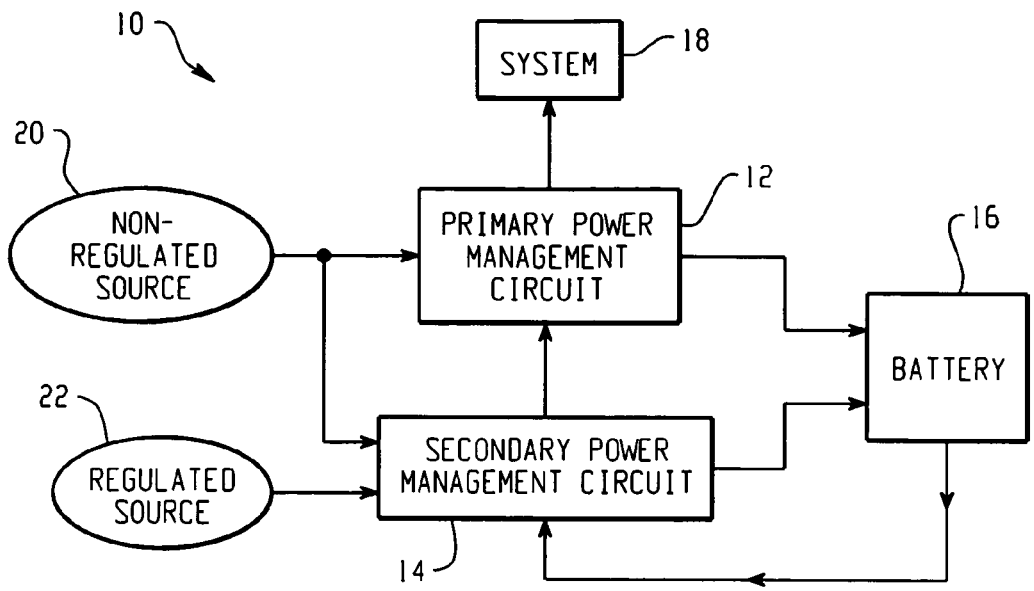
FIG. 1 is a block diagram depicting an example power management system for a mobile device.

FIG. 1 is a block diagram depicting an example power management system 10 for a mobile device. The power management system includes a primary power management circuit 12, a secondary power management circuit 14 and a rechargeable battery 16. Also illustrated are a mobile device system 18, a non-regulated power source 20 and a regulated power source 22. The mobile device system 18 may include some or all of the devices and/or systems in a mobile device other than the primary power management circuit 12, secondary power management circuit 14 and rechargeable battery 16. For example, the mobile device system 18 may include one or more processing devices, memory devices, user interface systems and devices, communications systems, and/or other systems and/or devices in a mobile device. The non-regulated source 20 may, for example, be a standard power source, such as a DC power supply, which does not have standardized limits on the amount of power that may be drawn from the source. The regulated source 22 may, for example, be a Universal Serial Bus (USB) host device or other source having a standardized limit on the amount of power that may be drawn (e.g., 100 mA and 500 mA maximum currents from a USB host).

In operation, power to the system 18 and the primary power management circuit 12 is supplied via the secondary power management circuit 14, which may draw power from the battery 16, non-regulated source 20 and/or regulated source 22. In addition, power to charge the rechargeable battery 16 may be drawn from the non-regulated power source 20 via the primary power management circuit 12 or from the regulated power source 22 via the secondary power management circuit 14. The primary power management circuit 12 is configured to control the battery charging operation using power from the non-regulated source 20, and the secondary power management circuit 14 is configured to control the battery charging operation using power from the regulated source 22. Examples depicting the operation modes of the power management system 10 are provided below with reference to FIGS. 2-10.

Figure 2:
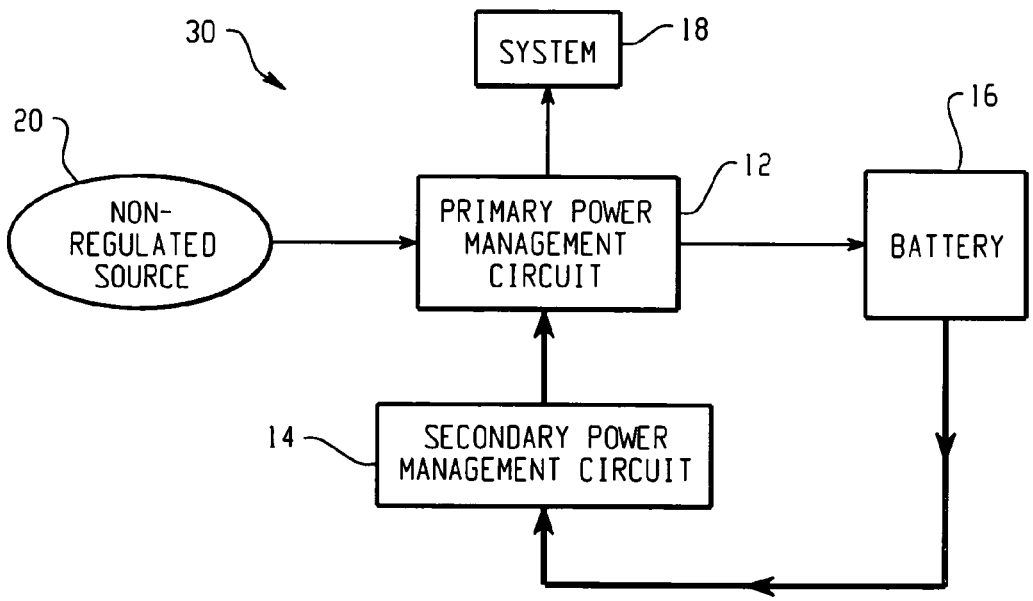
FIGS. 2 and 3 depict the operation of the example power management system when the mobile device is connected to a non-regulated power source.
Figure 3:
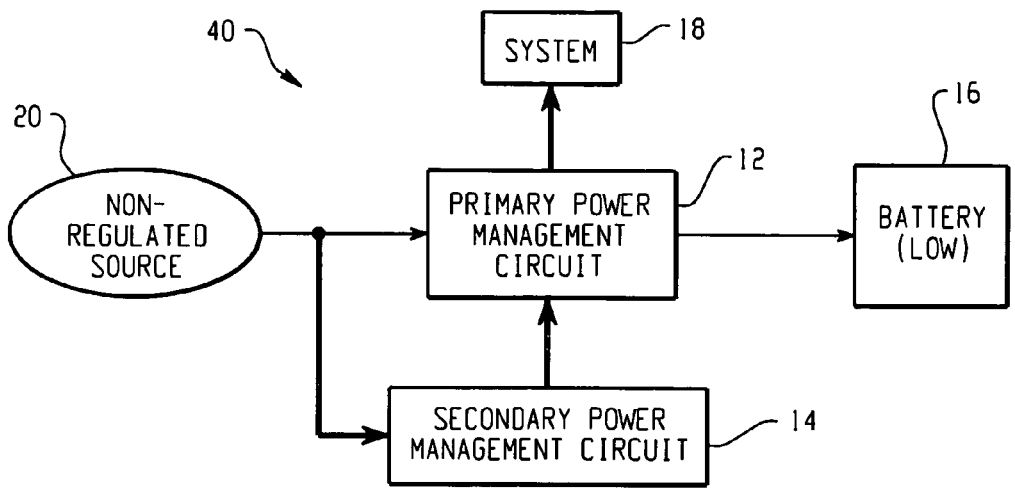

FIGS. 2 and 3 depict the operation of the example power management system when the mobile device is connected to a non-regulated power source 20. FIG. 2 depicts an operational mode when the rechargeable battery 16 has enough stored energy to power the system 18, and FIG. 3 depicts an operational mode when the rechargeable battery 16 has been depleted and cannot adequately power the system 18. The bolder arrows in FIGS. 2 and 3 depict the flow of power that is used to power the system 18, and the narrower arrows depict the flow of power used to charge the rechargeable battery 16.

In the example of FIG. 2, the power management system 30 is connected to a non-regulated power source 20, and the battery 16 has enough charge to power the system 18. The power management system 30 may, for example, determine that the battery 16 has enough charge to power the system 18 if its terminal voltage is above a pre-determined threshold level (e.g., 3.2 V). In this example 30, power from the battery 16 is routed to the primary power management circuit 12 by the secondary power management circuit 14, and is used by the primary power management circuit 12 to supply power to the system 18. Once power has been supplied to the primary power management circuit 12, the primary power management circuit 12 is configured to charge the battery 16 from the non-regulated power source 20.

In the example of FIG. 3, the power management system 40 is connected to a non-regulated power source 20, and the battery 16 has been depleted below a level at which it can adequately supply power to the system 18. For example, the system 40 may determine that the battery 16 is depleted by measuring that the terminal voltage of the battery 16 has fallen below a pre-determined voltage level. In this example 40, power from the non-regulated source 20 is routed to the primary power management circuit 12 by the secondary power management circuit 14, and is used by the primary power management circuit 12 to supply power to the system 18. Once power has been supplied to the primary power management circuit 12, the primary power management circuit 12 is configured to charge the battery 16 from the non-regulated power source 20.

Figure 4:
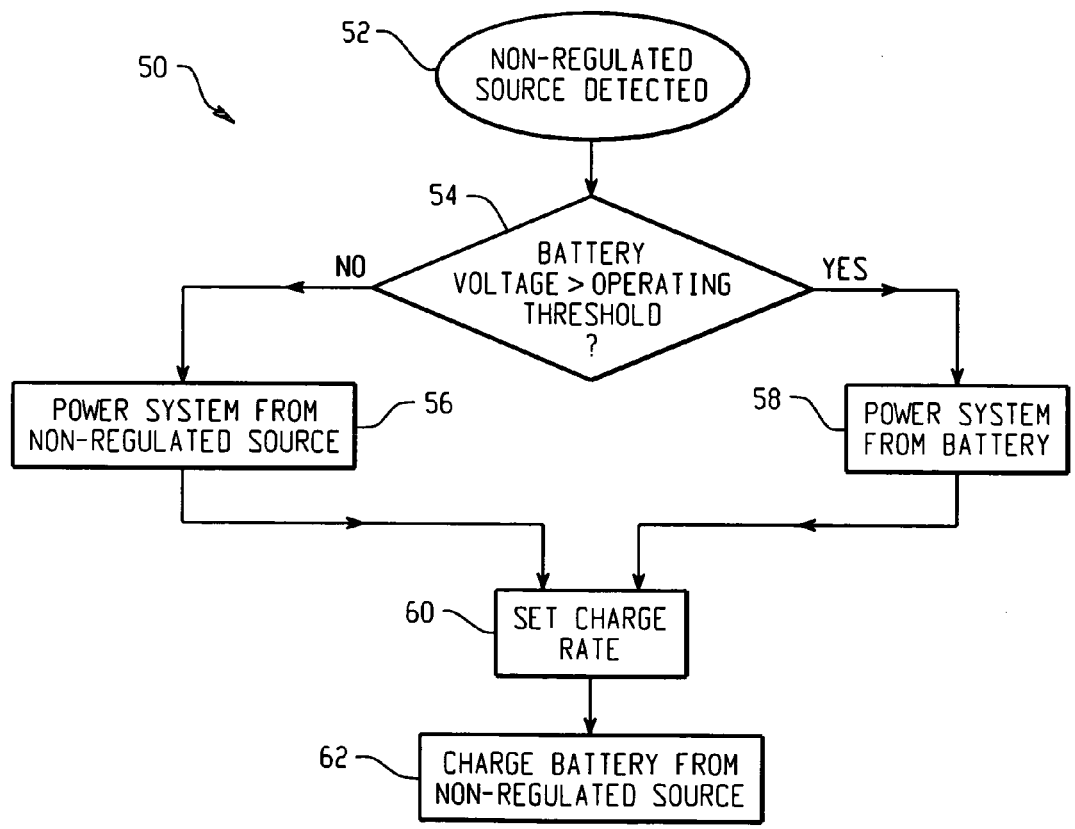
FIG. 4 is a flow diagram depicting an example method for supplying power to a mobile device when the mobile device is connected to a non-regulated power source.

FIG. 4 is a flow diagram depicting an example method 50 for supplying power to a mobile device when the mobile device is connected to a non-regulated power source. At step 52, the non-regulated power source is detected by the mobile device. Then, at step 54, the mobile device determines whether a rechargeable battery in the mobile device has a sufficient amount of stored energy to power the mobile device, for example, by determining if the terminal voltage of the battery is above an operating threshold for the mobile device. If the battery does not have sufficient energy, however, then the system is powered from the non-regulated source at step 56. If the battery has sufficient energy, then the system is powered from the battery at step 58. Once the system is powered at step 56 or 58, the charge rate for charging the rechargeable battery is set at step 60, and the battery is charged from the non-regulated source at step 62.

It should be understood that similar to the other processing flows described herein, one or more of the steps and the order in the flowchart may be altered, deleted, modified and/or augmented and still achieve the desired outcome.

Figure 5:
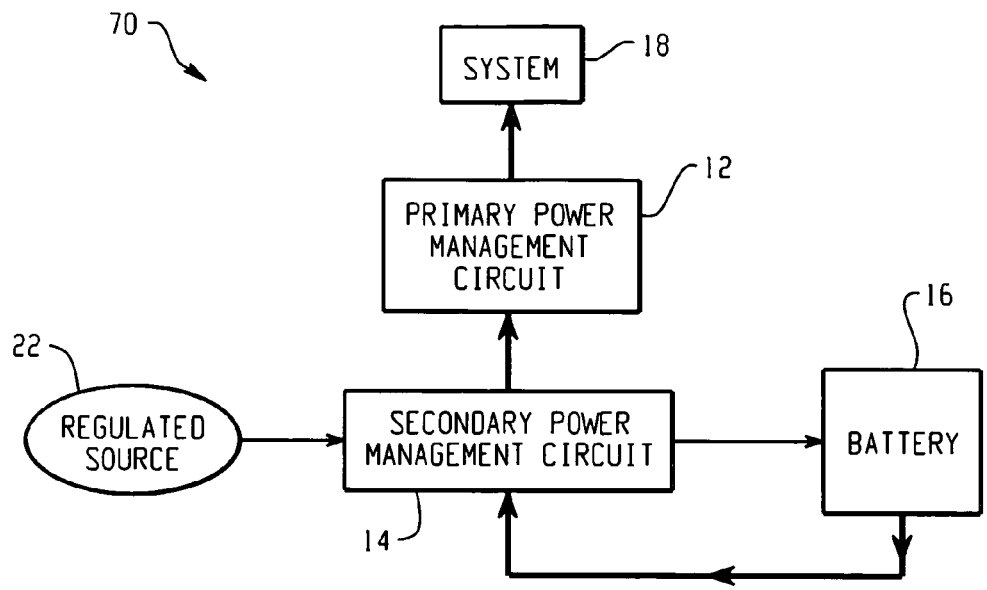
FIGS. 5 and 6 depict the operation of the example power management system when the mobile device is connected to a regulated power source.
Figure 6:
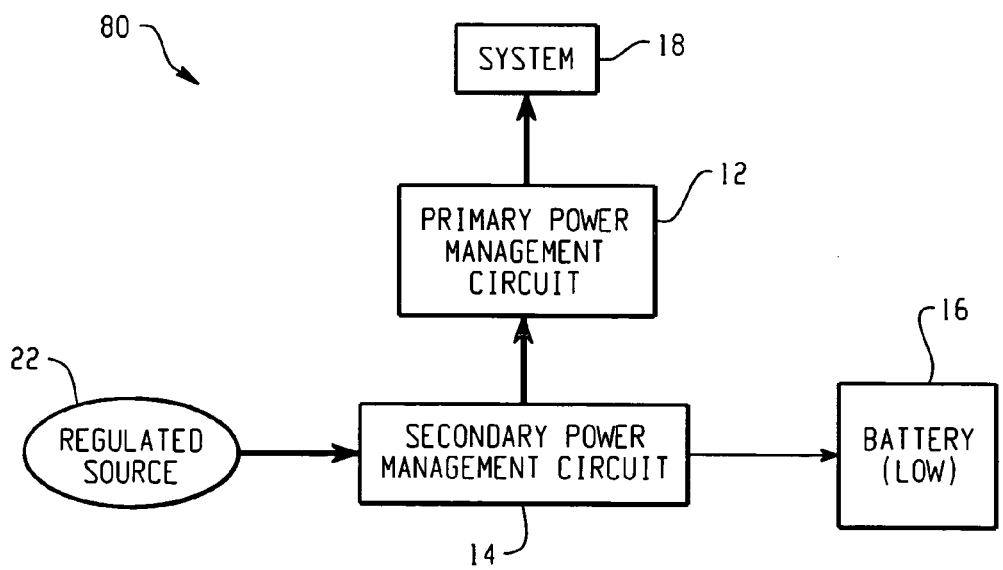

FIGS. 5 and 6 depict the operation of the example power management system when the mobile device is connected to a regulated power source 22. FIG. 5 depicts an operational mode when the rechargeable battery 16 has enough stored energy to power the system 18, and FIG. 6 depicts an operational mode when the rechargeable battery 16 has been depleted and cannot adequately power the system 18. The bolder arrows in FIGS. 5 and 6 depict the flow of power that is used to power the system 18, and the narrower arrows depict the flow of power used to charge the rechargeable battery 16.

In the example of FIG. 5, the power management system 70 is connected to a regulated power source 22, and the battery has enough charge to power the system 18. In this example 70, power from the battery 16 is routed to the primary power management circuit 12 by the secondary power management circuit 14, and is used by the primary power management circuit 12 to supply power to the system 18. In addition, the secondary power management circuit 12 is configured to charge the battery 16 from the non-regulated power source 20.

In the example of FIG. 6, the power management system 70 is connected to a regulated power source 22, and the battery 16 has been depleted below a level at which it can adequately supply power to the system 18. In this example 70, power from the regulated source 22 is routed to the primary power management circuit 12 by the secondary power management circuit 14, and is used by the primary power management circuit 12 to supply power to the system 18. The secondary power management circuit 12 is configured to use any additional power available from the regulated power source 22 to charge the battery 16.

Figure 7:
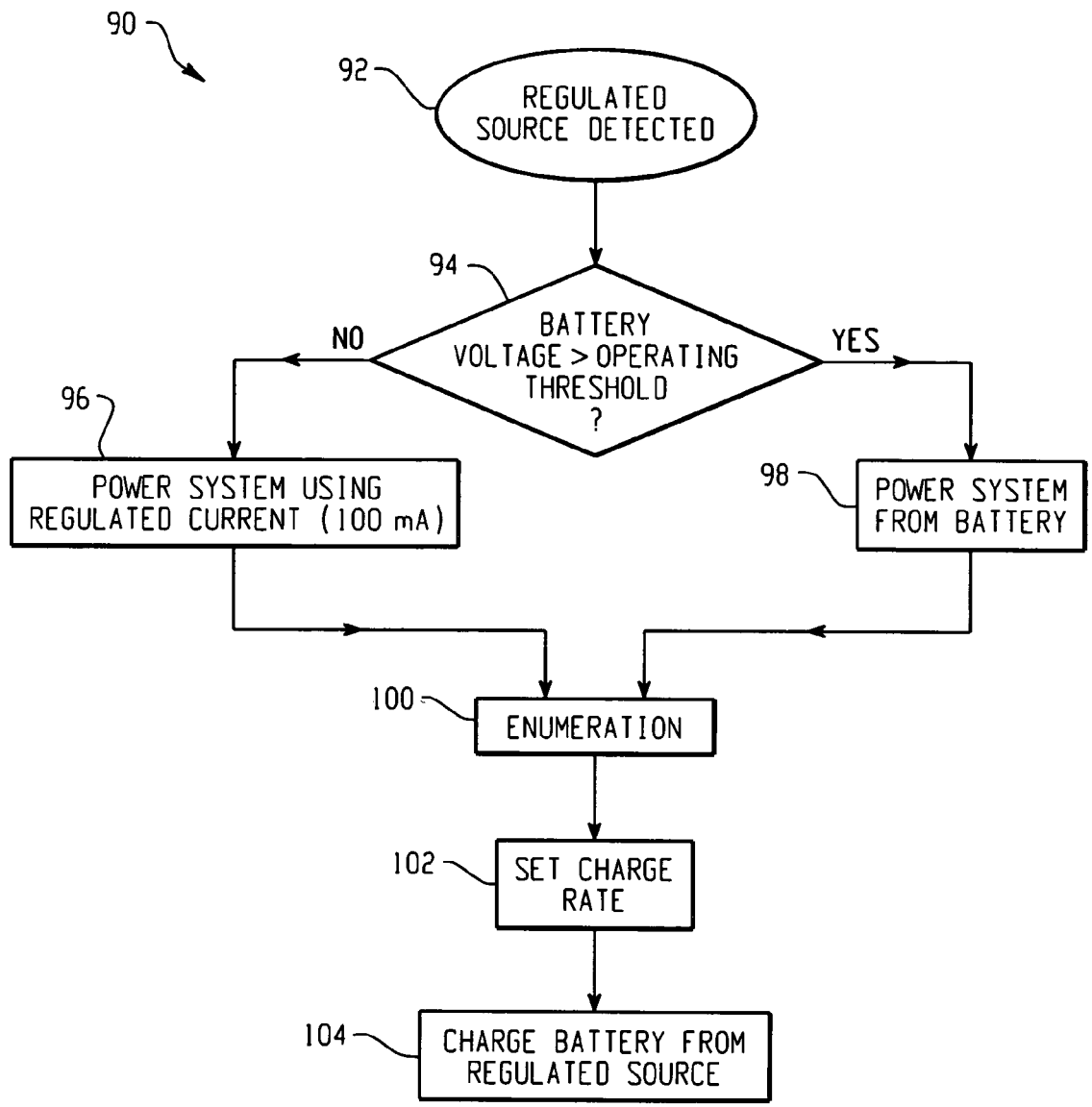
FIG. 7 is a flow diagram depicting an example method for supplying power to a mobile device when the mobile device is connected to a regulated power source.

FIG. 7 is a flow diagram depicting an example method 90 for supplying power to a mobile device when the mobile device is connected to a regulated power source. At step 92, the regulated power source is detected by the mobile device. Then, at step 94, the mobile device determines whether a rechargeable battery in the mobile device has a sufficient amount of stored energy to power the mobile device, for example by determining if the terminal voltage of the battery is above an operating threshold for the mobile device. If the battery does not have sufficient energy, then the system is powered from the regulated source at step 96. In the case of a USB source, for example, the system may be powered using the 100 mA maximum allowable current from the Vbus line prior to enumeration. If the battery has sufficient energy to power the mobile device, then the system is powered from the battery at step 98.

Once the system has been powered at step 96 or 98, an enumeration procedure may be performed at step 100 in order to obtain an additional power allotment from the regulated source. In the case of a USB source, the continued supply of power from the regulated source may be contingent upon a successful enumeration at step 100. After enumeration is complete, a charge rate for charging the rechargeable battery from the regulated source is set at step 102. Any amount of power available from the regulated source that is not needed to power the system may be delegated to charging the battery in step 102. The battery is then charged from the regulated source at step 104. An example system and method for charging a battery from a regulated source is described in commonly-owned U.S. patent application Ser. No. 10/372,180, entitled "Circuit and Method of Operation for an Electrical Power Supply," which is incorporated herein by reference.

Figure 8:
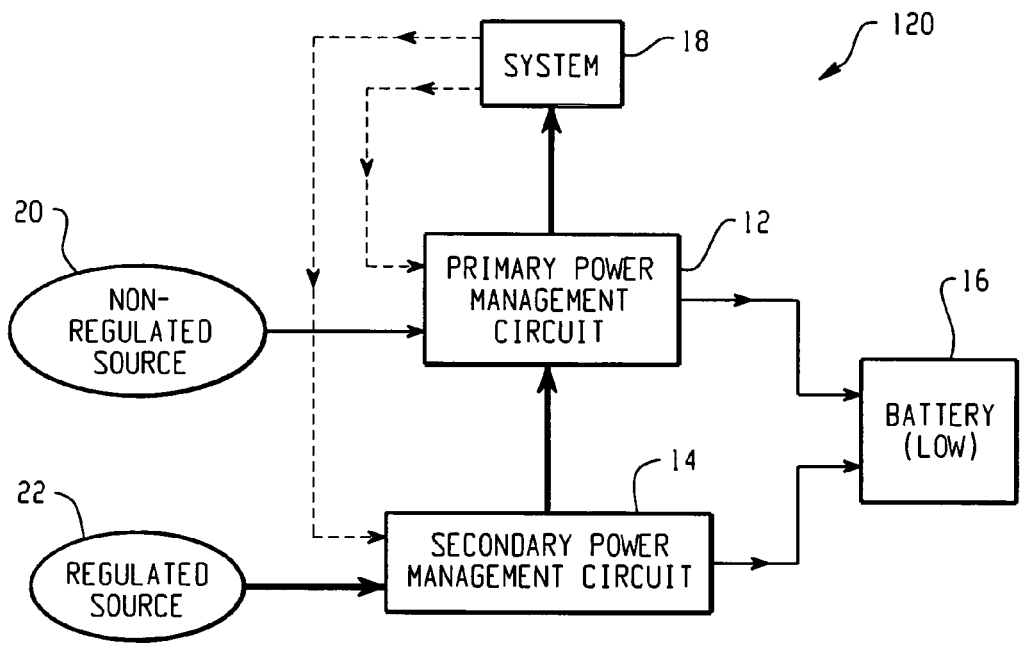
FIGS. 8 and 9 depict the operation of the example power management system when the mobile device is connected to both a non-regulated source and a regulated source.
Figure 9:
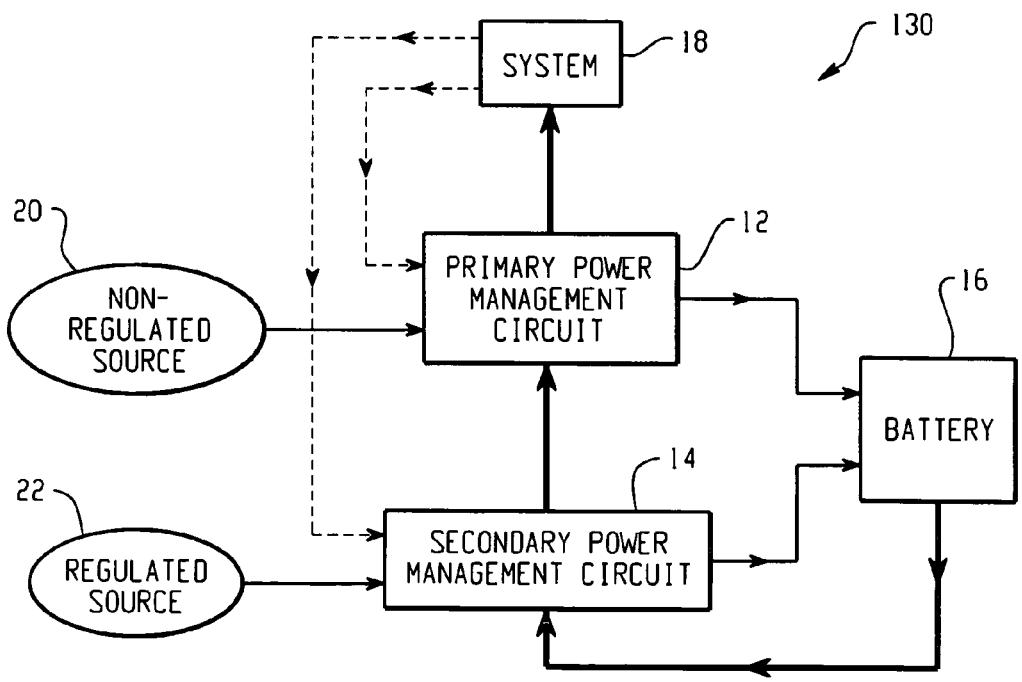

FIGS. 8 and 9 depict the operation of the example power management system when the mobile device is connected to both a non-regulated source 20 and a regulated source 22. FIG. 8 depicts an operational mode for use when the rechargeable battery 16 has been depleted and cannot adequately power the system 18, and FIG. 9 depicts on operational mode for use when the rechargeable battery 16 has enough stored energy to power the system 18. The bolder arrows in FIGS. 8 and 9 depict the flow of power that is used to power the system 18 and the narrower arrows depict the flow of power used to charge the rechargeable battery 16.

In the example of FIG. 8, the power management system 120 is connected to both a non-regulated power source 20 and a regulated power source 22, and the battery 16 has been depleted below a level at which it can adequately supply power to the system 18. In this example 120, power from the regulated power source 22 is routed to the primary power management circuit 12 by the secondary power management circuit 14, and the power from the regulated source 22 is used by the primary power management circuit 12 to supply power to the system 18.

Once the primary power management circuit 12 and the system 18 have received power from the regulated source 22 via the secondary power management circuit 14, the battery 16 may be charged from the non-regulated and/or regulated sources 20, 22. In one example, current may be drawn from both the non-regulated source 20 and regulated source 22 to charge the battery 16. The primary power management circuit 12 is configured to charge the battery 16 from the non-regulated power source 20, and the secondary power management circuit 14 is configured to charge the battery 16 from the regulated power source 22. The system 18 may control the percentage of the total charging current supplied by each of the primary and secondary power management circuits 12, 14, as indicated by the dotted arrows in FIG. 8.

In the example of FIG. 9, the power management system 130 is connected to both a non-regulated power source 20 and a regulated power source 22, and the battery 16 has enough charge to power the system 18. In this example 120, power from the battery 16 is routed to the primary power management circuit 12 by the secondary power management circuit 14, and the power from the battery 16 is used by the primary power management circuit 12 to supply power to the system 18. Once the primary power management circuit 12 and the system 18 have received power from the battery 16 via the secondary power management circuit 14, the battery 16 may be further charged from the non-regulated and/or regulated sources 20, 22, as described above with reference to FIG. 8.

Figure 10:
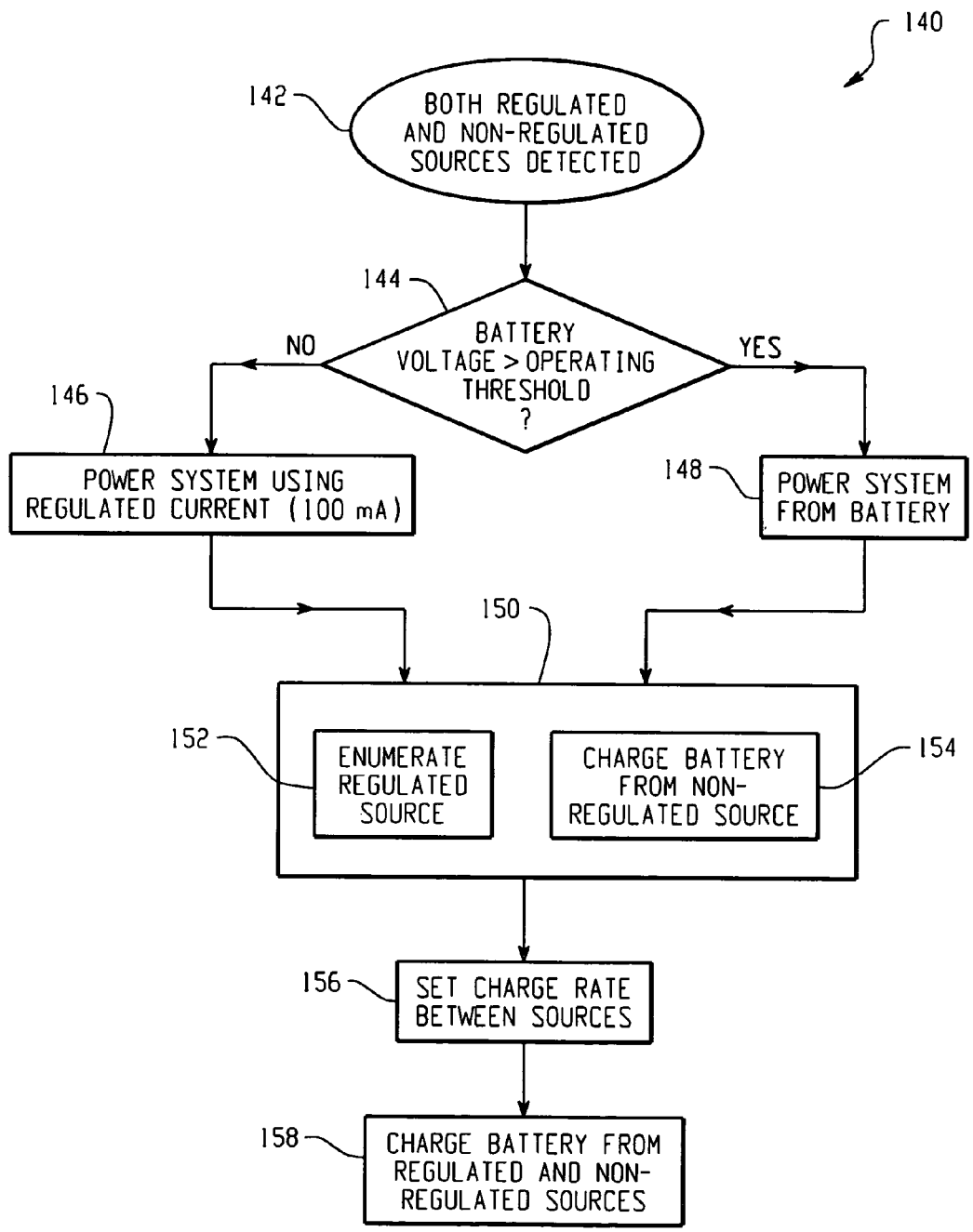
FIG. 10 is a flow diagram depicting an example method for supplying power to a mobile device when the mobile device is connected to both a non-regulated power source and a regulated power source.

FIG. 10 is a flow diagram depicting an example method 140 for supplying power to a mobile device when the mobile device is connected to both a non-regulated power source and a regulated power source. At step 142, the power sources are detected by the mobile device. Then, at step 144, the mobile device determines whether a rechargeable battery in the mobile device has a sufficient amount of stored energy to power the mobile device, for example, by determining if the terminal voltage of the battery is above an operating threshold for the mobile device. If the battery does not have sufficient energy, then the system is powered from the regulated source at step 146. In the case of a USB power source, for example, the system may be powered using the 100 mA maximum allowable Vbus current prior to enumeration. If the battery has sufficient energy to power the mobile device, then the system is powered from the battery at step 148.

Once the system has been powered at step 146 or 148, the method simultaneously performs an enumeration procedure for the regulated source at step 152 and begins charging the battery from the non-regulated source at step 154. Once enumeration is complete, the battery charge current may be divided between both the regulated and non-regulated sources at step 156, and the battery may be charged from both power sources at step 158.

Figure 11:
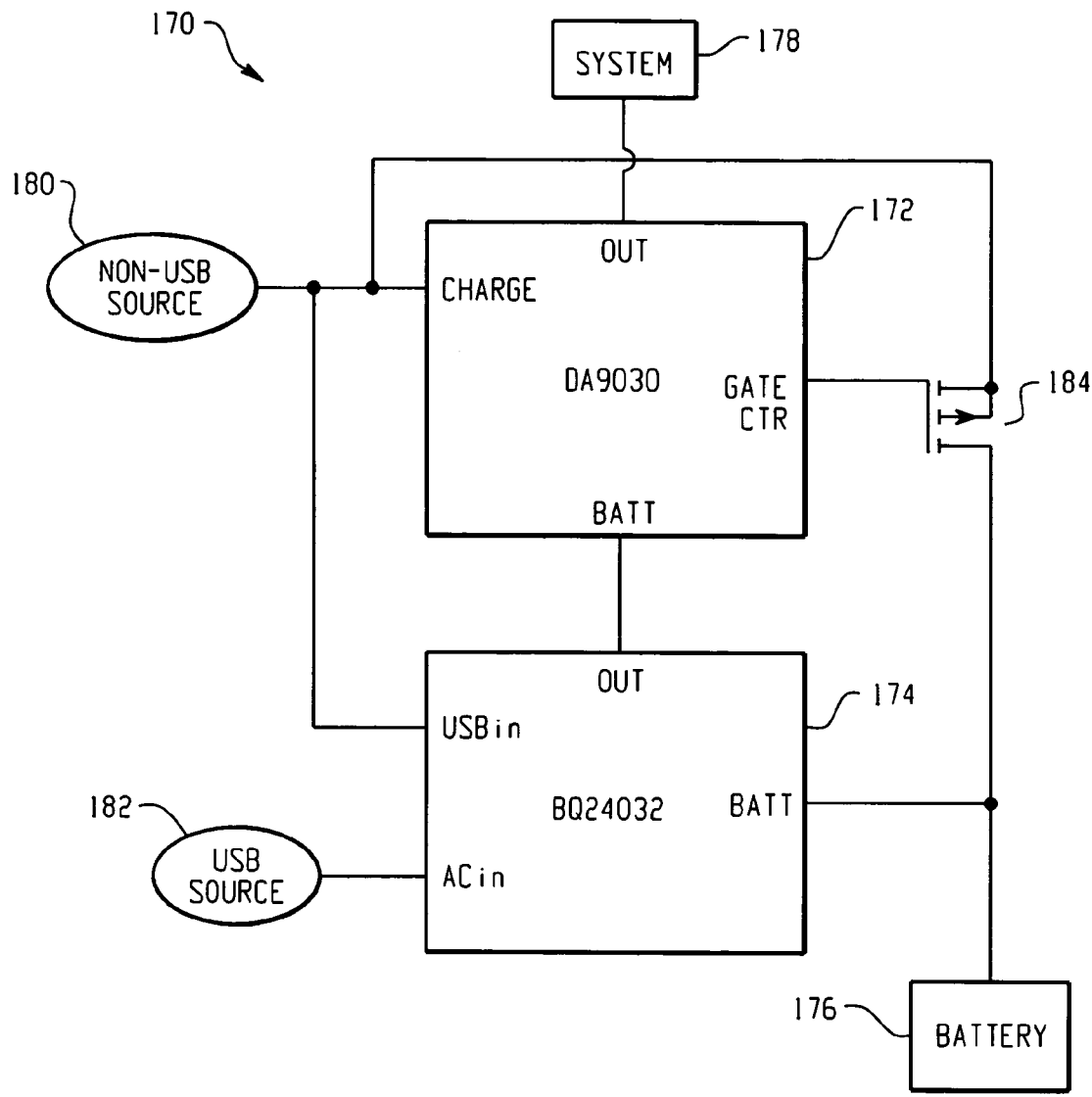
FIG. 11 is a block diagram depicting another example power management system for a mobile device.

FIG. 11 is a block diagram depicting another example power management system 170 for a mobile device. The power management system includes a primary power management circuit 172, a secondary power management circuit 174, a rechargeable battery 176, and a switching device 184. The primary power management circuit 172 may be the DA9030 power management IC for mobile platforms, manufactured by Dialog Semiconductor, the PM6650 power management IC, manufactured by Qualcomm, or some equivalent thereof. The secondary power management circuit 174 may be the BQ24032 single-chip charge and system power-path management IC, manufactured by Texas Instruments Incorporated, or its equivalent. The battery 176 may, for example, be a lithium ion battery, or other type of rechargeable battery suitable for use in a mobile device. The switching device 184 may, for example, be a transistor or transistor circuit, or some other type of controlled switching device or circuit.

Also illustrated in FIG. 11 are a mobile device system 178, a non-USB power source 180 and a USB power source 182. The mobile device system 178 may include some or all of the devices and/or systems in a mobile device other than the primary and secondary power management circuits 172, 174 and rechargeable battery 176. For example, the mobile device system 178 may include one or more processing devices (e.g., microprocessor, DSP, etc.), memory devices, user interface systems and devices, communications systems, and/or other systems and/or devices in a mobile device. The non-USB source 180 may, for example, be a DC power supply (e.g., AC adapter), or other power source that is not restricted by the power allotment requirements applicable to a USB host or hub. The USB source 182 may, for example, be a USB host or hub, or other USB device that can supply power to a USB port.

The power management system 170 enables the primary power management circuit 172 (e.g., DA9030) and secondary power management circuit 174 (e.g., BQ24032) to operate together to supply system and battery charging power from both USB and non-USB sources. The DA9030 is especially designed to support the power management requirements of Intel communication processors and PXA27X family of application processors for mobile handsets. The BQ24032 is especially designed to provide USB-port and DC supply power-path management functions for space limited portable applications. Other primary and/or secondary power management circuits could also be used. For instance, in one example, the Qualcomm PM6650 may be used as the primary power management circuit 172.

In the example of FIG. 11, a non-USB power port 180 is coupled to the charge pin of the DA9030, the USBin pin of the BQ24032 and a current-carrying terminal of the switching device 184. The USB power port 182 is coupled to the ACin pin of the BQ24032. The output (Out) of the BQ24032 supplies the Battery (Batt) input of the DA9030, and the output (Out) of the DA9030 supplies the system 178. In addition, the rechargeable battery 176 is coupled to the battery input/output pin (Batt) of the BQ24032 and also to the other current-carrying terminal of the switching device 184. The switching device 184 is controlled by the gate control output (Gate Ctr) of the DA9030.

The operation of the power management system 170 to supply power to the system 178 and charge the battery 176 is dependent on the state of the battery 176 and on the availability of a USB or Non-USB power source 180, 182. Both the DA9030 and BQ24032 are configured to charge the battery 176 at different rates, depending on the current battery charge. When the battery 176 is below the minimum system operational voltage level (e.g., 3.2 V), both the DA9030 and BQ24032 are configured to supply only a fraction of the set charge rate in order to gently pre-charge the battery, as recommended when charging Li+ batteries. During this pre-charge period, the terminal voltage on the battery 176 is typically not sufficient to power the system 178 and needs to be supplemented from the charging source 180, 182. This condition is referred to herein as a low battery condition.

In a first operational mode, the mobile device 170 is connected to a USB power source 182 and the battery 176 is in a low battery condition. When the USB power source is connected to the mobile device 170, the BQ24032 174 uses the 100 mA available from the Vbus line of the USB source 182 to supply power to the system 178 via the battery input (Batt) of the DA9030 172, and the system 178 communicates with the USB source 182 to attempt enumeration. Once USB enumeration is complete, the BQ24032 174 uses the allotted power from the USB source 182 (e.g., 500 mA) to both power the system 178 and charge the battery 176.

In a second operational mode, the mobile device 170 is connected to a USB power source 182 and the battery 176 is charged. In this mode, the BQ24032 174 routes power from the battery 176 to the DA9030 172 to supply the system 178. When the USB power source 182 is connected, the system 178 attempts enumeration with the USB source 182 in order to negotiate a maximum current (e.g., 500 mA) from the USB host, and upon successful enumeration the BQ24032 uses power from the USB source 182 to charge the battery 176.

In a third operational mode, the mobile device 170 is connected to a non-USB power source 180 and the battery 176 is in a low battery condition. When the non-USB power source is connected, the BQ24032 174 routes power from the non-USB source 180 to the system 178 via the battery input (Batt) of the DA9030 172. In addition, the DA9030 172 supplies power from the non-USB source 180 to charge the battery 176 by controlling the throughput of the switching device 184.

In a fourth operational mode, the mobile device 170 is connected to a non-USB power source 180 and the battery 176 is charged. In this mode, the BQ24032 174 routes power from the battery 176 to the system 178 via the battery input (Batt) of the DA9030 172. When the no-USB power source 182 is connected, the DA9030 172 supplies power from the non-USB source 180 to charge the battery 176 by controlling the throughput of the switching device 184.

In one example, the BQ24032 174 may also be used to supply power from the non-USB source 180 for charging the battery 176 in the third and fourth operational modes. In this example, the system 178 may control the percentage of the overall charge current supplied by each of the DA9030 172 and the BQ24032 174.

In a fifth operational mode, the mobile device 170 is connected to both USB and non-USB power sources 180, 182 and the battery 176 is in a low battery condition. When the USB power source 182 is connected to the mobile device 170, the BQ24032 174 uses the 100 mA available from the Vbus line of the USB source 182 to supply power to the system 178 via the battery input (Batt) of the DA9030 172, and the system 178 communicates with the USB source 182 to attempt enumeration. Once USB enumeration is complete, the BQ24032 174 uses the allotted power from the USB source 182 (e.g., 500 mA) to power the system 178 and charge the battery 176. In addition, once the DA9030 172 received power via the BQ24032 174, the DA9030 172 supplies power from the non-USB source 180 to charge the battery 176 by controlling the throughput of the switching device 184. The system 178 may control the percentage of the overall charge current supplied by each of the DA9030 172 and the BQ24032 174.

In a sixth operational mode, the mobile device 170 is connected to both USB and non-USB power sources 180, 182 and the battery 176 is charged. In this mode, the BQ24032 174 routes power from the battery 176 to the DA9030 172 to supply the system 178. When the USB power source 182 is connected, the system 178 attempts enumeration with the USB source 182 in order to negotiate a maximum current (e.g., 500 mA) from the USB host, and upon successful enumeration the BQ24032 uses power from the USB source 182 to charge the battery 176. In addition, the DA9030 172 may supply power from the non-USB source 180 to charge the battery 176 by controlling the throughput of the switching device 184. The system 178 may control the percentage of the overall charge current supplied by each of the DA9030 172 and the BQ24032 174.

Figure 12:
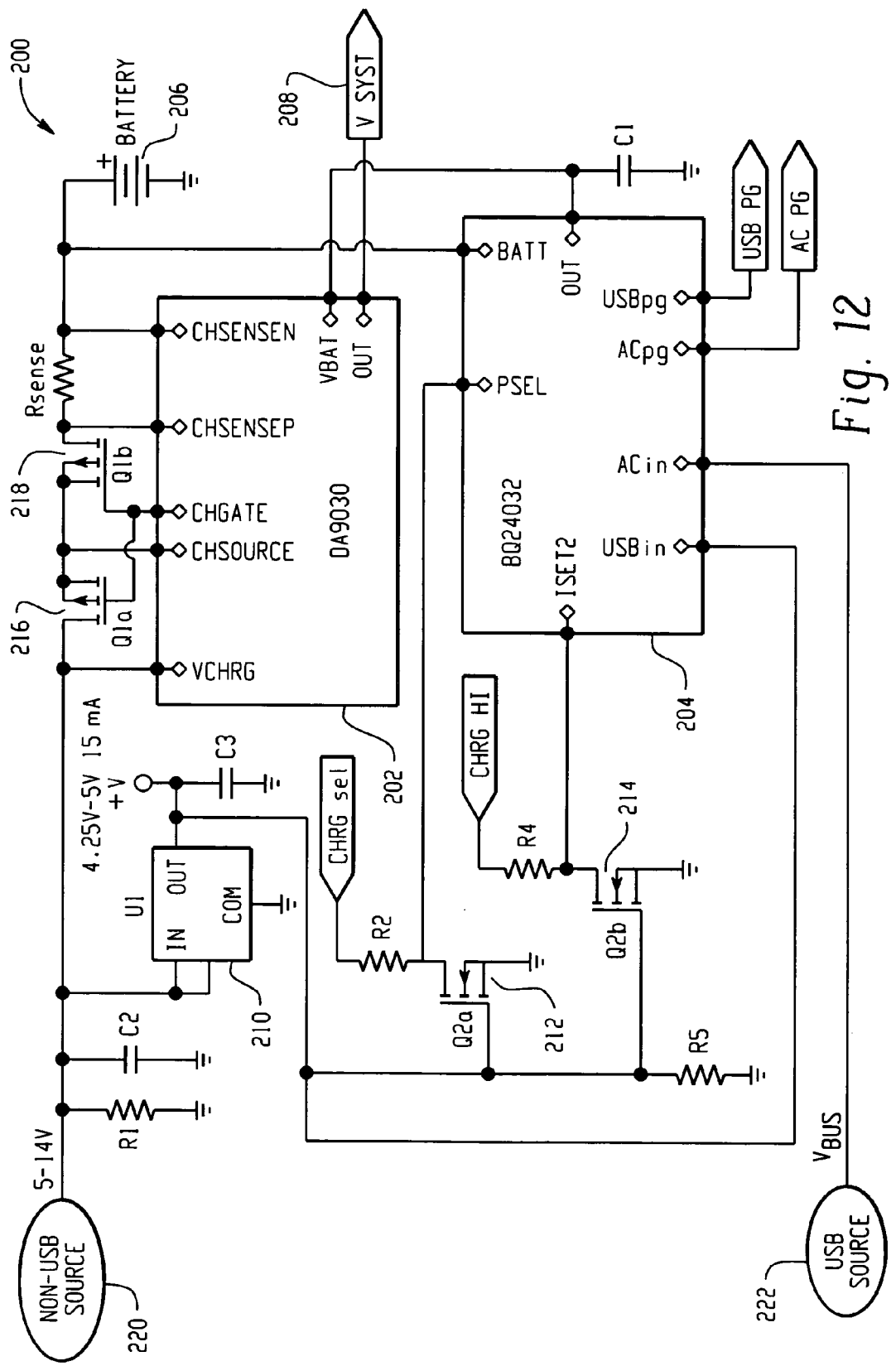
FIG. 12 is a circuit diagram depicting a more detailed example of a power management system for a mobile device.

FIG. 12 is a circuit diagram depicting a more detailed example of a power management system 200 for a mobile device. The power management system 200 includes a primary power management circuit 202 (e.g., DA9030), a secondary power management circuit 204 (e.g., BQ24032), a rechargeable battery 206 and a switching circuit 216, 218. The primary and secondary power management circuits 202, 204 operate as described above with reference to FIG. 11 to supply power to the mobile device system 208 and charge the battery 206 using power from a non-USB source 220 and/or a USB source 222.

Also illustrated in this example 200 is a voltage regulator circuit 210, a source selection circuit 212, and a current selection circuit 214. The voltage regulator circuit 210 is configured to regulate the power supplied by the non-USB source 220 to provide a voltage-regulated input (e.g., 4.2-5.0 V) to the secondary power management circuit 204. In this manner, the voltage regulator circuit 210 may operate as an overvoltage protection circuit for the USBin input of the BQ24032 (204).

The source selection circuit 212 includes a transistor (Q2a) and a source selection control signal (CHRG sel), which are used to generate a power source selection input to the PSEL pin of the secondary power management circuit 204. The source selection control signal (CHRG sel) may, for example, be generated by a processing device in the mobile device system 208, and is used to control which power source input 220, 222 is used to supply the primary power management circuit 202. In the case of a BQ24032, a logic low input to the PSEL pin causes the BQ24032 to select USBin, which is coupled to the regulated output of the voltage regulator 210, and a logic high input to the PSEL pin causes the BQ24032 to select ACin, which is coupled to the Vbus line of the USB source 222.

The current selection circuit 214 includes a transistor (Q2b) and a current selection control signal (CHRG HI), which are used to generate a current selection input to the ISET2 pin of the secondary power management circuit 204. The current selection control signal (CHRG HI) may, for example, be generated by a processing device in the mobile device system 208, and is used to set the maximum current to a high value (e.g., 500 mA) or a low value (e.g., 100 mA). The system 208 may, for example, set the maximum current to the low value as a default setting, and then reset the maximum current to the high value upon successful enumeration with the USB source 222.

Figure 13:
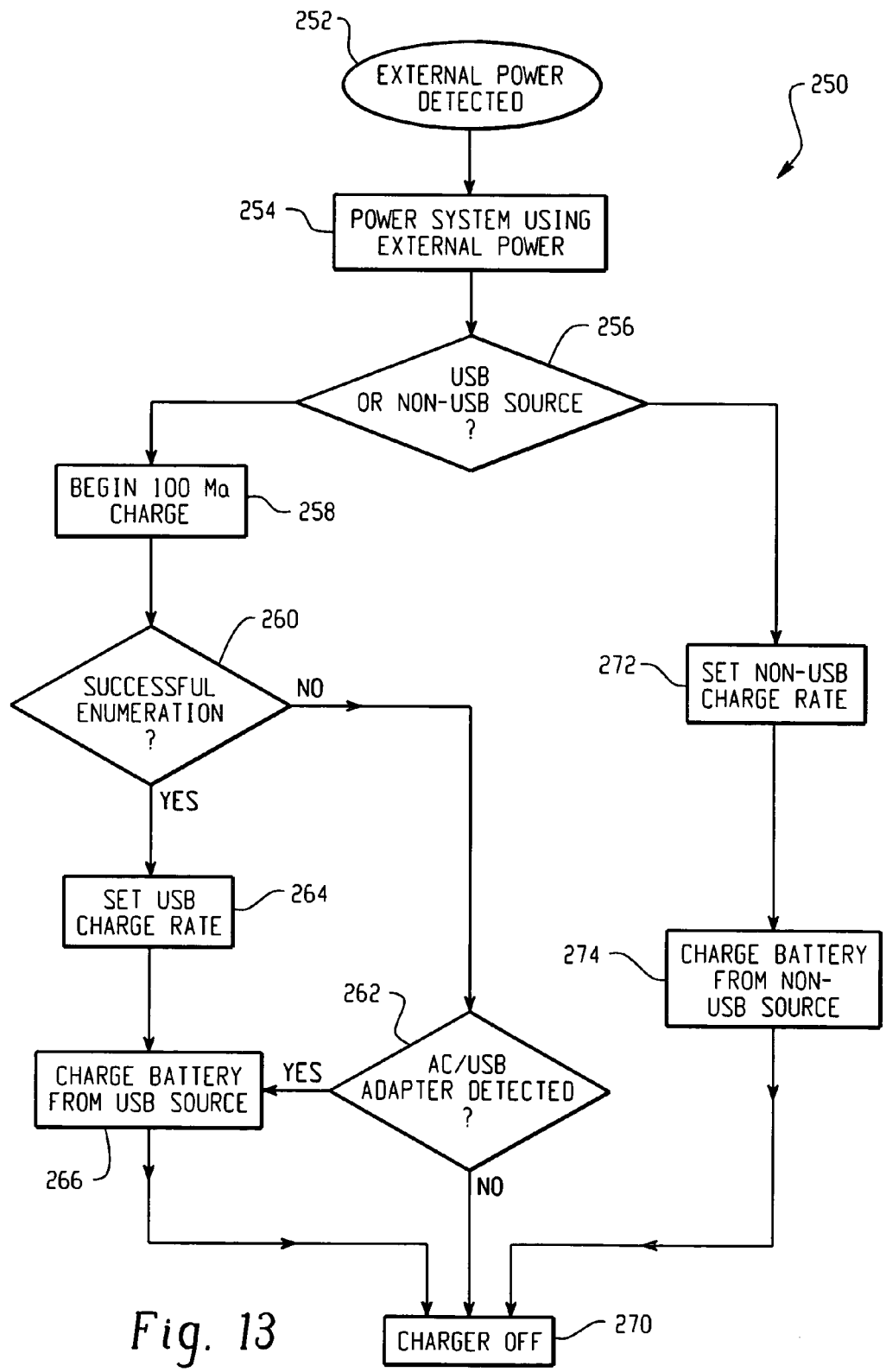
FIG. 13 is a flow diagram depicting another example method for supplying power to a mobile device.

FIG. 13 is a flow diagram depicting another example method 250 for supplying power to a mobile device. An external power source is detected by the mobile device at step 252, and the power source is used to power the mobile device system at step 254. Then, at step 256, the method determines whether the mobile device is connected to a USB source, a non-USB source, or both. If the mobile device is connected to a USB source, then the method proceeds to step 258 (the USB path). If the mobile device is connected to a non-USB source, then the method proceeds to step 272 (the non-USB path). If the mobile device is connected to both a USB and a non-USB source, then the method performs the steps in the USB path (starting at step 258) in parallel with the steps in the non-USB path (starting at step 272).

In the USB path, the mobile device begins charging the rechargeable battery using a default maximum current (e.g., 100 mA) at step 258. Then, at step 260, the mobile device attempts to enumerate with the USB power source. If the enumeration is successful (e.g., an enumeration response is received within 100 ms), then a charge rate is set at step 264 and the battery is charged from the USB source at step 266. If the enumeration is not successful, then the method determines if the USB source is an AC/USB adapter at step 262. An AC/USB adapter is a device used to supply power from an AC power source to a USB port, such as the device described in U.S. patent application Ser. No. 10/864,584, entitled "Universal Serial Bus Charger For a Mobile Device," which is incorporated herein by reference. If an AC/USB adapter is detected, then the method proceeds to step 264. If an AC/USB adapter is not detected at step 262, or when the charging process at step 266 is completed, the charger is turned off at step 270.

In the non-USB path, the charge rate from the non-USB source is set at step 272. If the mobile device is connected to both a USB and a non-USB power source, then step 272 may be delayed until the USB path reaches step 262, or may begin immediately upon completion of step 256. Once the non-USB charge rate is set, the battery is charged from the non-USB source at step 274, and upon completion the charger is turned off at step 270.

Figure 14:
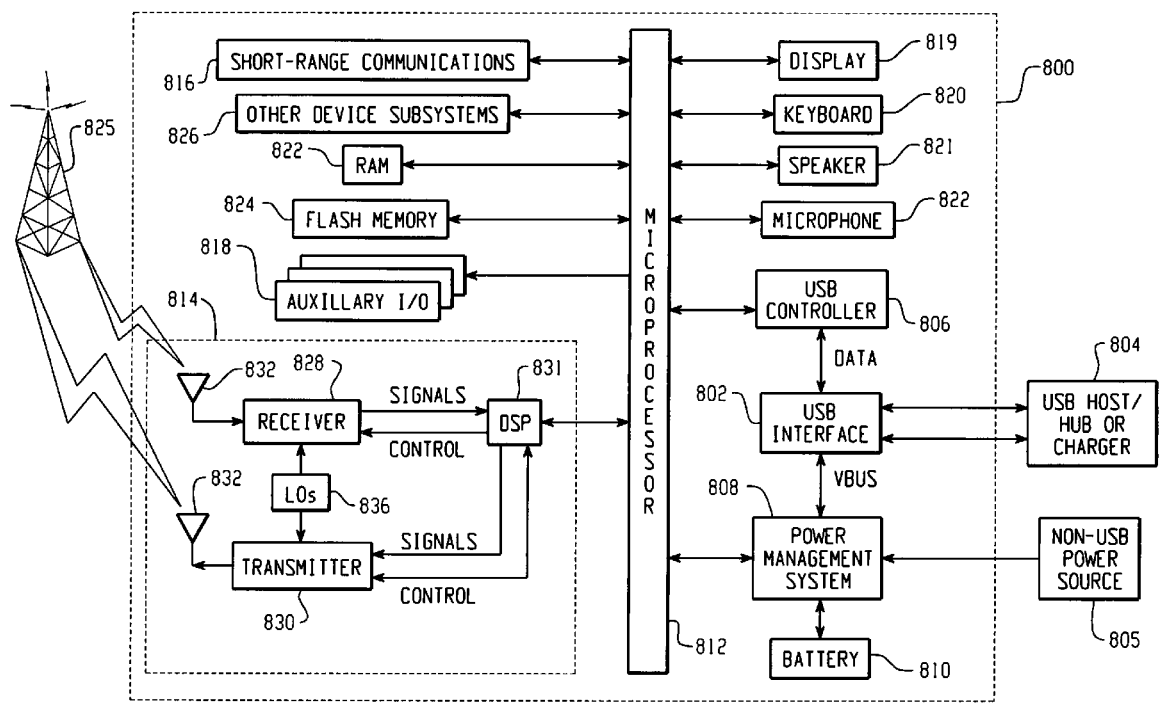
FIG. 14 is a block diagram of an example mobile device that includes a power management system for connected the mobile device to a USB power source and/or a non-USB power source.

FIG. 14 is a block diagram of an example mobile device 800 that includes a power management system 808 for connected the mobile device 800 to a USB power source 804 and/or a non-USB power source 805. The mobile device 800 includes the power management system 808, a USB interface 802, a USB controller 806, a rechargeable battery 810, and a processing device 812. The USB interface 802 may be used by the mobile device 800 to provide USB power to the power management system 808 charging subsystem 808, and may also be used to communicate data between a USB host or hub 804 and the USB controller 806. The power management system 808 provides power to the mobile device 800 and charges the rechargeable battery 810, as described above. The USB controller 806 monitors the USB data lines (D+ and D−), and controls data communication between the processing device 812 and a USB host 804.

In addition to the subsystems and components described above, the mobile device 800 also may include a communications subsystem 814, a short-range communications subsystem 816, input/output devices 818-822, memory devices 822, 824, and various other device subsystems 826.

The processing device 812 controls the overall operation of the mobile device 800. Operating system software executed by the processing device 812 may be stored in a persistent store such as a flash memory 824, but may also be stored in other types of memory devices, such as a read only memory (ROM) or similar storage element. In addition, operating system software, specific device applications, or parts thereof, may be temporarily loaded into a volatile store, such as a random access memory (RAM) 822. Communication signals received by the mobile device 800 may also be stored to RAM 822.

The processing device 812, in addition to its operating system functions, enables execution of software applications on the device 800. A predetermined set of applications that control basic device operations, such as data and voice communications, may be installed on the device 800 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via the wireless network 825. The PIM data items may be integrated, synchronized and updated via the wireless network 825 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is hereby incorporated into the present application by reference.

Communication functions, including data and voice communications, are performed through the communication subsystem 814, and possibly through the short-range communications subsystem 816. If the mobile device 800 is enabled for two-way communications, then the communication subsystem 814 includes a receiver 828, a transmitter 830, and a processing module 831, such as a digital signal processor (DSP). In addition, the communication subsystem 814, configured as a two-way communications device, includes one or more antenna elements 832, 834, and local oscillators (LOs) 836. The specific design and implementation of the communication subsystem 814 is dependent upon the communication network 825 in which the mobile device 800 is intended to operate. For example, a device 800 destined for a North American market may include a communication subsystem 814 designed to operate within the Mobitex™ mobile communication system or DataTAC™ mobile communication system, whereas a device 800 intended for use in Europe may incorporate a General Packet Radio Service (GPRS) communication subsystem.

Network access requirements vary depending upon the type of communication system 825. For example, in the Mobitex™ and DataTAC™ networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 800 may send and receive communication signals over the communication network 825. Signals received by the antenna 832 through the communication network 825 are input to the receiver 832, which may perform such common receiver functions as signal amplification, frequency down conversion, filtering, channel selection, and analog-to-digital conversion. Analog-to-digital conversion of the received signal allows the DSP 831 to perform more complex communication functions, such as demodulation and decoding. In a similar manner, signals to be transmitted are processed by the DSP 831, and are the input to the transmitter 830 for digital-to-analog conversion, frequency up-conversion, filtering, amplification and transmission over the communication network 825 via the antenna 834.

In addition to processing communication signals, the DSP 831 provides for receiver 828 and transmitter 830 control. For example, gains applied to communication signals in the receiver 828 and transmitter 830 may be adaptively controlled through automatic gain control algorithms implemented in the DSP 831.

In a data communication mode, a received signal, such as a text message or web page download, is processed by the communication subsystem 814 and input to the processing device 812. The received signal is then further processed by the processing device 812 for output to a display 819, or alternatively to some other auxiliary I/O device 818. A device user may also compose data items, such as e-mail messages, using a keyboard 821, such as a QWERTY-style keyboard, and/or some other auxiliary I/O device 818, such as a touchpad, a rocker switch, a thumb-wheel, or some other type of input device. The composed data items may then be transmitted over the communication network 825 via the communication subsystem 814.

In a voice communication mode, overall operation of the device 800 is substantially similar to data communication mode, except that received signals are output to a speaker 821, and signals for transmission are generated by a microphone 822. Alternative voice or audio I/O subsystems, such as a voice message recording subsystem, may also be implemented on the device 800. In addition, the display 819 may also be utilized in voice communication mode, for example to display the identity of a calling party, the duration of a voice call, or other voice call related information.

The short-range communications subsystem 816 enables communication between the mobile device 800 and other proximate systems or devices, which need not necessarily be similar devices. For example, the short-range communications subsystem 816 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

The invention claimed is:

1. A power management system for a mobile device, comprising:
   a primary power management circuit configured to receive an input voltage and use the input voltage to supply power to the mobile device;
   a secondary power management circuit configured to select at least one of a battery signal from a rechargeable battery, a first power source input, or a second power source input as the input voltage to the primary power management circuit, the input voltage to the primary power management circuit being received by the primary power management circuit from the secondary power management circuit;
   the primary power management circuit being further configured to use the first power source to charge the rechargeable battery; and
   the secondary power management circuit being further configured to use the second power source input to charge the rechargeable battery.

2. The power management system of claim 1, wherein the second power source input is received from a universal serial bus (USB) source and the first power source input is received from a non-USB source.

3. The power management system of claim 1, wherein if the battery signal is below an operational threshold of the mobile device, then the secondary power management circuit being operable to select the first power source input or the second power source input as the input voltage to the primary power management circuit.

4. The power management system of claim 3, wherein if the battery input is above the operational threshold of the mobile device, then the secondary power management circuit being operable to select the battery signal as the input voltage to the primary power management circuit.

5. The power management system of claim 2, wherein the mobile device is configured to receive enumeration information and set a maximum current of the second power source based on the enumeration information.

6. The power management system of claim 1, wherein if the mobile device is connected to both the first power source input and the second power source input, then the primary and secondary power management circuits being operable to set a charge rate for the rechargeable battery using both the first and second power source inputs.

7. The power management system of claim 6, wherein the primary and secondary power management circuits receive one or more control inputs from a processing device in the mobile device to set the charge rate between the first and second power source inputs.

8. The power management system of claim 1, further comprising:
   a switching device coupled between the first power source input and the rechargeable battery, wherein the first power management circuit controls a current flow through the switching device in order to charge the rechargeable battery from the first power source input.

9. A mobile device, comprising:
   a rechargeable battery;
   a processing sub-system;
   a primary power management circuit configured to receive an input voltage and use the input voltage to supply power to the mobile processing device;
   a secondary power management circuit configured to select at least one of a battery signal from the rechargeable battery, a first power source input, or a second power source input as the input voltage to the primary power management circuit, the input voltage to the primary power management circuit being received by the primary power management circuit from the secondary power management circuit;
   the primary power management circuit being further configured to use the first power source to charge the rechargeable battery; and
   the secondary power management circuit being further configured to use the second power source to charge the rechargeable battery.

10. The mobile device of claim 9, wherein the second power source input is received from a universal serial bus (USB) source and the first power source input is received from a non-USB source.

11. The mobile device of claim 9, wherein the primary power management circuit is a DA9030 power management integrated circuit.

12. The mobile device of claim 9, wherein the primary power management circuit is a PM6650 power management integrated circuit.

13. The mobile device of claim 9, wherein the secondary power management circuit is a BQ24032 single-chip charge and system power-path management integrated circuit.

14. A method for supplying power to a mobile device that includes a primary power management circuit, a secondary power management circuit and a rechargeable battery, comprising:
   selecting at least one of a battery input from the rechargeable battery, a first power source input, or a second power source input as an input voltage to the primary power management circuit;
   using the input voltage to the primary power management circuit to supply power to the mobile device, the input voltage to the primary power management circuit being received by the primary power management circuit from the secondary power management circuit; and
   using at least one of the first power source input and the second power source input to charge the rechargeable battery;
   wherein the primary power management circuit is used to charge the rechargeable battery from the first power source input and the secondary power management circuit is used to charge the rechargeable battery from the second power source input.

15. The method of claim 14, wherein the second power source input is received from a universal serial bus (USB) source and the first power source input is received from a non-USB source.

16. The method of claim 14, wherein the secondary power management circuit is used to select at least one of the battery input from the rechargeable battery, the first power source input, or the second power source input as the input voltage to the primary power management circuit.

17. The method of claim 14, further comprising:
   detecting if the battery signal from the rechargeable battery is below an operational threshold of the mobile device;
   if the battery input from the rechargeable battery is below the operational threshold of the mobile device, then selecting at least one of the first power source input or the second power source input as the input voltage to the primary power management circuit; and if the battery signal from the rechargeable battery is not below the operational threshold of the mobile device, then selecting the battery input as the input voltage to the primary power management circuit.

18. The method of claim 14, further comprising:

receiving enumeration information from a universal serial bus (USB) host device; and setting a maximum current of the second power source based on the enumeration information.

19. The method of claim 14, further comprising:

if the mobile device is connected to both the first power source input and the second power source input, then setting a charge rate for the rechargeable battery using both the first and second power source inputs.

* * * * *

UNITED STATES PATENT AND TRADEMARK OFFICE
CERTIFICATE OF CORRECTION

PATENT NO. : 7,657,290 B2  Page 1 of 1
APPLICATION NO. : 11/156388
DATED : February 2, 2010
INVENTOR(S) : Veselic et al.

It is certified that error appears in the above-identified patent and that said Letters Patent is hereby corrected as shown below:

Column 12, line 59, please replace "input from the" with -- signal from the --

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,657,290 B2 Page 1 of 1
APPLICATION NO. : 11/156388
DATED : February 2, 2010
INVENTOR(S) : Veselic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this

Thirtieth Day of November, 2010

David J. Kappos
*Director of the United States Patent and Trademark Office*